United States Patent
Aoki et al.

[11] Patent Number: 5,899,183
[45] Date of Patent: May 4, 1999

[54] HEATING APPARATUS FOR VEHICLE, HAVING HEAT-GENERATING UNIT

[75] Inventors: Shinji Aoki, Kariya; Toshio Morikawa, Toyota; Hajime Ito, Kariya; Goro Uchida, Toyota; Yasushi Kato, Toyota; Norifumi Ban, Toyota, all of Japan

[73] Assignee: Denso Corporation, Kariya, Japan

[21] Appl. No.: 08/937,049

[22] Filed: Sep. 24, 1997

[30] Foreign Application Priority Data

Oct. 2, 1996 [JP] Japan .................................. 8-262135

[51] Int. Cl.⁶ .................................................. F02N 17/06
[52] U.S. Cl. ............................. 123/142.5 R; 123/198 R
[58] Field of Search .......................... 62/133, 323.4; 237/12.3 R; 123/142.5 R, 198 R; 122/26; 126/247

[56] References Cited

U.S. PATENT DOCUMENTS

| | | | |
|---|---|---|---|
| 4,269,033 | 5/1981 | Birch | 62/323.4 |
| 4,391,242 | 7/1983 | Mashio | 62/323.4 |
| 4,610,146 | 9/1986 | Tanemura | 62/323.4 |
| 4,993,377 | 2/1991 | Itakura | |
| 5,046,924 | 9/1991 | Gras et al. | 62/323.4 |
| 5,050,395 | 9/1991 | Berger | 62/323.4 |
| 5,117,643 | 6/1992 | Sakurai et al. | 62/323.4 |
| 5,546,755 | 8/1996 | Krieger | 62/323.4 |

FOREIGN PATENT DOCUMENTS

A-3-57877  3/1991  Japan.
A-6-92134  4/1994  Japan.

*Primary Examiner*—Erick R. Solis
*Attorney, Agent, or Firm*—Harness, Dickey & Pierce, PLC

[57] ABSTRACT

According to the present invention, when a vehicle speed is less than a set value (e.g., 40 km/h) and a throttle opening degree is more than a set value, it is determined that the vehicle is accelerating, and a viscous clutch is turned off. Therefore, a shearing operation of high-viscosity fluid by a rotor of a viscous heater is not performed. In this way, a driving load applied to an engine is reduced, so that an accelerating state suitable for an intention of a driver can be obtained. Further, when the vehicle speed is more than a set value (e.g., 40 km/h) and an engine rotational speed is more than a set value (e.g., 3500 r.p.m.), the viscous clutch is turned off, and a driving load applied to the engine and a V-belt is reduced.

15 Claims, 12 Drawing Sheets

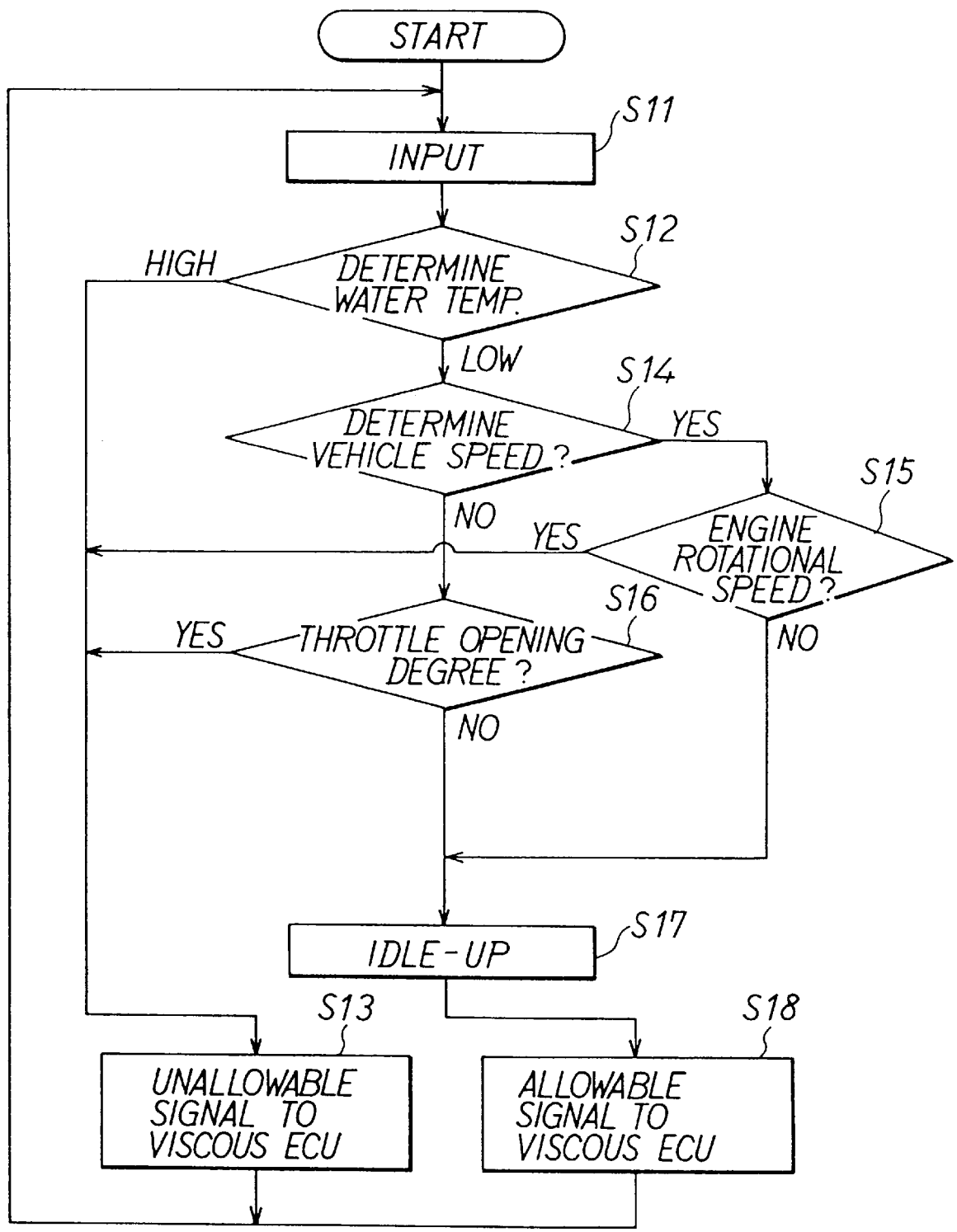

HEATING APPARATUS FOR VEHICLE, HAVING HEAT-GENERATING UNIT

CROSS REFERENCE TO THE RELATED APPLICATION

This application is based on and claims priority of Japanese Patent Application of No. Hei. 8-262135 filed on Oct. 2, 1996, the content of which is incorporated herein by reference.

BACKGROUND OF THE INVENTION

1. Field of the Invention

The present invention relates to a heating apparatus for controlling, based on an accelerating state of a vehicle a rotation as well as a stop of the rotation of a rotor in a heat-generating unit using a shearing force, for heating cooling water to be supplied from an engine to a heating heat exchanger.

2. Description of Related Art

Conventionally, as a heating apparatus for a vehicle, there has been generally known a hot water type heating apparatus for heating a passenger compartment, in which cooling water for cooling a water-cooled engine is supplied to a heater core disposed in a ducts and air heated while passing through the heater core is blown into the passenger compartment by a blower to heat the passenger compartment.

Recently, an improvement of an engine efficiency is highly demanded for an engine mounted on a vehicle; however, when the engine efficiency improves, heat loss decreases; and therefore the cooling water for cooling the engine cannot be heated sufficiently. Further, in a case of a vehicle having a diesel engine or a lean burn engine, the heat amount generated by the engine is too small to heat the cooling water sufficiently. In the vehicle where the heat amount generated by the engine is small, a temperature of the cooling water in the cooling water circuit cannot be maintained at a predetermined temperature (e.g., 80° C.), there occurs a problem in that a heating capacity for the passenger compartment is insufficient.

To overcome such a problem, as disclosed in JP-A-2-246823 or JP-A-3-57877, there has been conventionally proposed a heating apparatus for a vehicle, in which a heat-generating unit using a shearing force, for heating cooling water supplied from the engine to the heater core is disposed in a cooling water circuits and when a temperature of the cooling water in the cooling water circuit, detected by a cooling water temperature sensor, is lower than a set cooling water temperature, the heat-generating unit is operated to improve the heating capacity for the passenger compartment.

The heat-generating unit transmits a rotational driving force of the engine to a shaft through a belt transmitting mechanism and an electromagnetic clutch, a heat-generating chamber is formed in a housing, and a cooling water passage is formed at an outer periphery of the heat-generating chamber. Further, a rotor which rotates integrally with the shaft is disposed in the heat-generating chamber, and a shearing force generated by a rotation of the rotor is applied to viscous fluid such as silicon oil sealed in the heat-generating chamber to generate heat. The cooling water is heated by the generated heat. That is, the heating apparatus for a vehicle uses a rotational driving force (driving torque) applied to the rotor of the heat-generating unit as an auxiliary heat source for heating operation.

In the heating apparatus for a vehicle, provided with the conventional heat-generating unit, because a rotational driving force (driving torque) applied to the rotor of the heat-generating unit is used as the auxiliary heat source for heating operation, a large driving load is applied to the engine by the driving torque. Therefore, while the heat-generating unit is operating, if a driver desires an acceleration and steps on an acceleration pedal an accelerating state suitable for an intention of the driver cannot be obtained, because a driving load of the engine is increased. There occurs a problem that a driveability deteriorates or an emission (NOx) increases.

SUMMARY OF THE INVENTION

It is an object of the present invention to provide a heating apparatus for a vehicle, capable of preventing a deterioration of the driveability at a time of an acceleration of the vehicle and further reducing the emission, by reducing a driving load applied to the engine while the vehicle is in an accelerating state.

According to the present invention, when an accelerating state of a vehicle is detected by accelerating state detecting means, a clutch is controlled to reduce or minimize a load of an engine, so that a driving load applied to a driving source is reduced. In this way, an accelerating state suitable for an intention of a driver can be obtained, a driveability improves, and an emission can be reduced.

Further, when a vehicle speed detected by a vehicle speed sensor is less than a set value and further a throttle opening degree detected by a throttle opening degree sensor is more than a set value, a clutch is controlled to reduce or minimize a load of an engine, so that a driving load applied to a driving source is reduced Still further, when a vehicle speed detected by a vehicle speed sensor is more than a set value and further an engine rotational speed detected by a rotational speed sensor is more than a set value, a clutch is controlled to reduce or minimize a load of an engine, so that a driving load applied to a driving source is reduced.

Still further, when an engine load detected by an engine load sensor is more than a set value, a clutch is controlled to reduce or minimize a load of an engine, so that a driving load applied to a driving source is reduced.

BRIEF DESCRIPTION OF THE ACCOMPANYING DRAWINGS

Additional objects and advantages of the present invention will be more readily apparent from the following detailed description of preferred embodiments thereof when taken together with the accompanying drawings in which:

FIG. 7 is a flow chart of a control program of an engine ECU in the first embodiment;

DETAILED DESCRIPTION OF THE PREFERRED EMBODIMENTS

Figure 1:
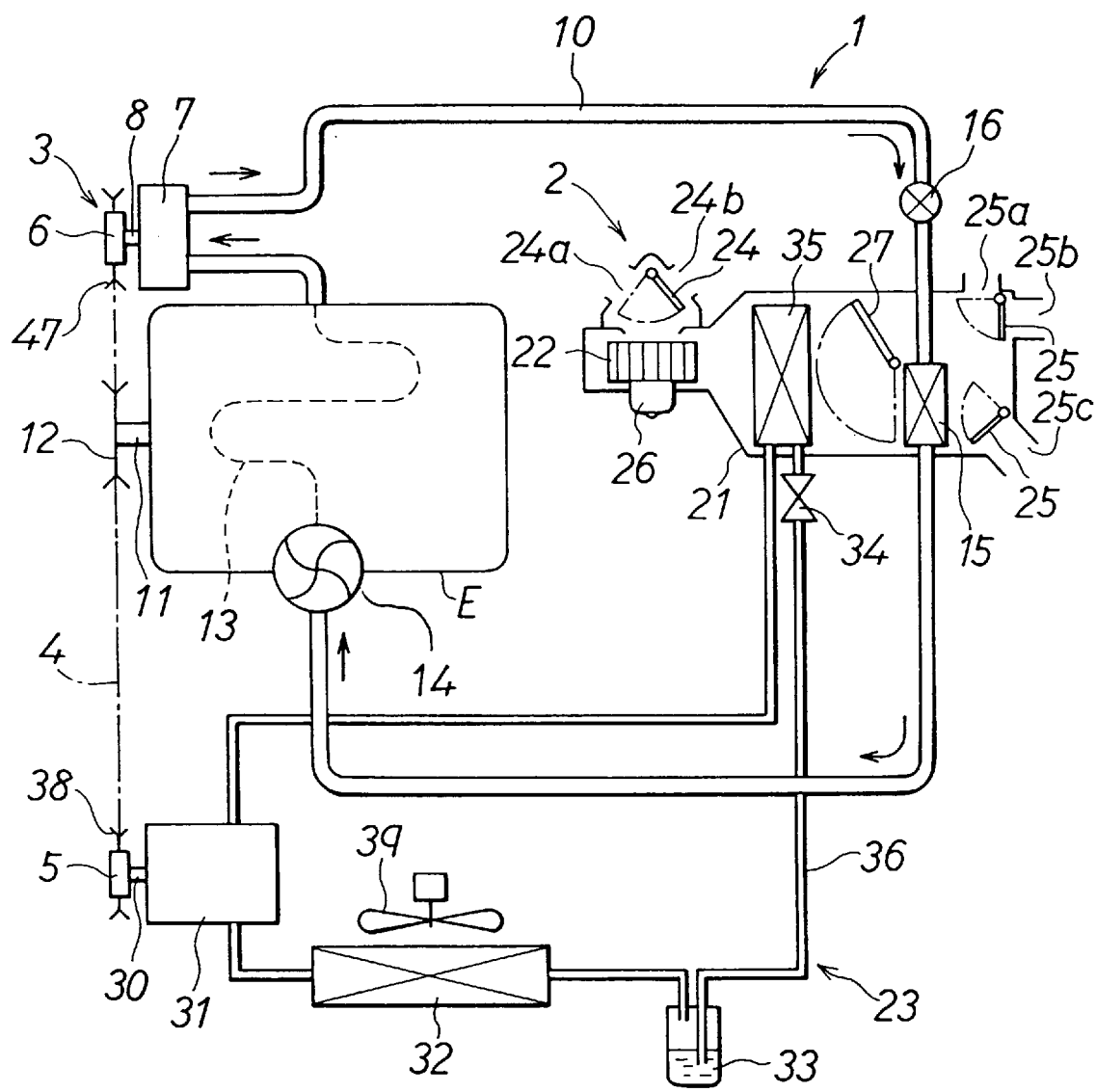
FIG. 1 is a schematic view showing an entire structure of an air conditioning apparatus for a vehicle, according to a first embodiment of the present invention.
Figure 2:
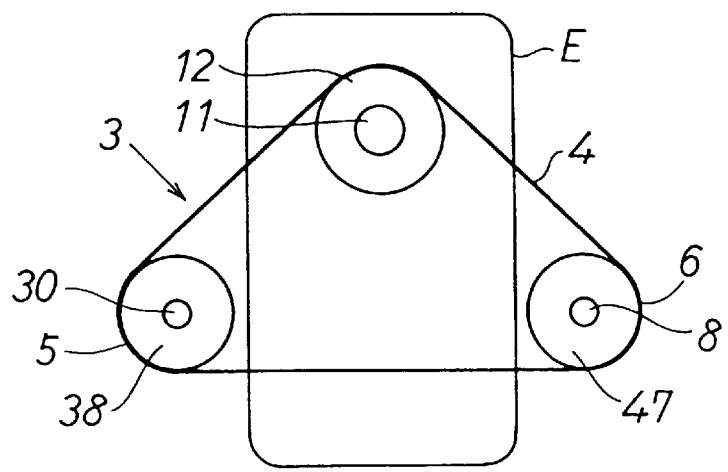
FIG. 2 is a schematic view showing an engine and a driving force transmitting apparatus in the first embodiment.

FIGS. 1 to 11 show a first embodiment of the present invention. FIG. 1 shows an entire structure of an air conditioning apparatus for a vehicle, FIG. 2 shows an engine and a driving force transmitting apparatus.

An air conditioning apparatus 1 for a vehicle is equipped with a water-cooled diesel engine E (hereinafter simply referred to as "engine") disposed in an engine compartment of a vehicle, an air conditioning unit (hereinafter referred to as "A/C unit") 2 for air-conditioning a passenger compartment, a driving force transmitting apparatus 3 for transmitting a rotational driving force of the engine E, a heat-generating unit 7 (hereinafter referred to as "viscous heater") using a shearing force, for heating cooling water for cooling the engine E, an air-conditioning ECU 100 (hereinafter referred to as "A/C ECU") (see FIG. 5) for controlling the A/C unit 2, a viscous ECU 200 for controlling the viscous heater 7, an engine ECU 300 (see FIG. 5) for controlling the engine E, and the like.

The engine E is a heat source apparatus for heating operation of the present invention and is an internal combustion engine for rotating a compressor (described later) and the viscous heater 7. Further, a crank pulley 12 is attached to a crankshaft (output shaft) 11 of the engine E. The engine E is provided with a water jacket 13 around a cylinder block and a cylinder head. The water jacket 13 is disposed in a cooling water circuit 10 through which the cooling water circulates.

In the cooling water circuit 10, there is disposed a water pump 14 for compulsorily pumping the cooling water, a radiator (not shown) for cooling the cooling water by heat-exchanging the cooling water and air, a heater core 15 for heating air by heat-exchanging the cooling water and air, a water valve 16 for adjusting an amount of the cooling water flowing into the heater core 15, and the like. The water pump 14 is disposed at an upstream side of the water jacket 13 of the engine E and is rotated by the crankshaft 11 of the engine E.

The A/C unit 2 is constructed by a duct 21, a blower 22, a refrigeration cycle 23, the heater core 15, and the like. At an upwind side of the duct 21, there is rotatably provided an inside air/outside air switching damper 24 for selectively opening and closing an outside air inlet 24a and an inside air inlet 24b to switch an air inlet mode.

At a downwind side of the duct 21, there is rotatably provided a mode switching damper 25 for selectively opening and closing a defroster air outlet 25a, a face air outlet 25b, and a foot air outlet 25c to switch an air outlet mode. The blower 22 is blower means (centrifugal blower) rotated by a blower motor 26 to generate an air flow toward the passenger compartment in the duct 21.

The heater core 15 is a heating heat exchanger, is disposed within the front duct 21 at a downstream side (downwind side) of an evaporator 35 with reference to the air flow direction and is connected to the cooling water circuit 10 at a downstream side of the heat-generating unit 7 with reference to the flow direction of the cooling water. The heater core 15 is heating means for heating air by heat-exchanging the air having passed through the evaporator 35 and the cooling water.

At an upwind side of the heater core 15, there is rotatably provided an air-mixing damper 27. The air-mixing damper 27 is outlet temperature adjusting means for adjusting a ratio between an amount of air (warm air) passing through the heater core 15 and an amount of air (cool air) bypassing the heater core 15 so that a temperature of air blown out into the passenger compartment can be adjusted. The air mixing damper 27 is actuated by an actuator (not shown) such as a servomotor through one or plural link plate(s).

The refrigeration cycle 23 is composed of the compressor (refrigerant compressor) 31, a condenser (refrigerant condenser) 32, a receiver (gas-liquid separator) 33, an expansion valve (decompressing device) 34, the evaporator (refrigerant evaporator) 35, a refrigerant pipe 36 for circularly connecting these components, and the like. The compressor 31 has a shaft 30 as a rotating body, and when a rotational driving force of the engine E is transmitted to the shaft 30, the compressor 31 compresses the refrigerant sucked from the evaporator 35 and discharges the refrigerant toward the condenser 32. The reference numeral 39 indicates a condenser fan.

The driving force transmitting apparatus 3 includes, as shown in FIGS. 1 and 2, a multi-stage type V-belt 4 hung on a crank pulley 12 attached to the crankshaft 11 of the engine E. An electromagnetic clutch (hereinafter referred to as "A/C clutch") 5 of the compressor 31, on which the V-belt 4 is hung, an electromagnetic clutch (hereinafter referred to as "viscous clutch") 6, on which the V-belt 4 is hung with the A/C clutch 5, and the like.

The V-belt 4 is belt transmitting means for transmitting a rotational driving force (driving force) of the engine E to the shaft 30 of the compressor 31 and also for transmitting a rotational driving force (driving force) of the engine E to the shaft 8 of the viscous heater 7 through the viscous clutch 6.

The A/C clutch 5 has a V-pulley 38 driven by and connected to the crank pulley 12 (see FIGS. 1 and 2) attached to the crankshaft 11 of the engine E through the V-belt 4.

When an electric current is supplied to an electromagnetic coil thereof or a supply of the electric current to the electromagnetic coil is stopped, an output portion (armature, inner hub) is attracted to or is separated from an input portion (rotor) so that a transmission of the rotational driving force from the engine E to the shaft 30 of the compressor 31 is intermitted.

Figure 3:
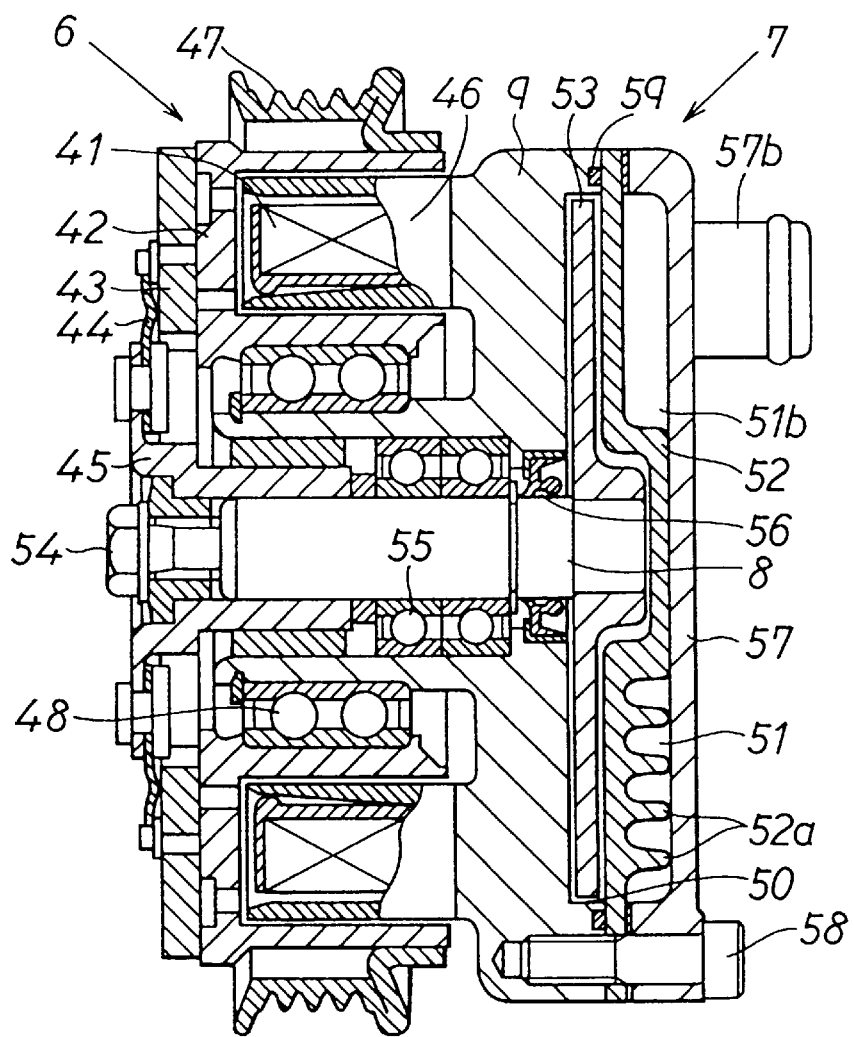
FIG. 3 is a cross sectional view showing a viscous clutch and a viscous heater in the first embodiment.

The viscous clutch 6 is clutch means of the present invention, and constructed, as shown in FIG. 3, by an electromagnetic coil 41 for generating a magnetomotive force when being electrified, a rotor 42 rotated by the engine E, an armature 43 attracted toward the rotor 42 by the magnetomotive forces an inner hub 45 connected to the armature 43 with a plate spring 44 and supplying a rotational driving force to the shaft 8 of the viscous heater 7, and the like.

The electromagnetic coil 41 is structured by winding a conductive lead wire covered with an insulating material. The electromagnetic coil 41 is disposed in the stator 46 and is fixedly molded in the stator 46 with an epoxy resin. The stator 46 is fixed on a front surface of a housing 9 of the viscous heater 7.

A V-pulley 47 (see FIGS. 1 and 2) hanging the V-belt 4 on an outer periphery thereof is joined to the rotor 42 by joining means such as welding and is a rotating body (input portion of the viscous clutch 6) which always rotates by a rotational driving force of the engine E; transmitted thereto through the V-belt 4. The rotor 42 is a first friction member formed of magnetic material to have a U-shaped cross section, and is rotatably supported on an outer periphery of the housing 9 of the viscous heater 7 with a bearing 48 disposed in an inner periphery thereof.

The armature 43 is a second friction member formed of magnetic material in a ring-shaped plate, and has a friction surface formed in a ring-shaped plate, which is opposed to a friction surface of the rotor 42 by an air gap (e.g., a clearance of 0.5 mm) in an axial direction. When the armature 43 is attracted to (engaged with) the friction surface of the rotor 42 by the electromotive force of the electromagnetic coil 41, the rotational driving force of the engine E is transmitted from the rotor 42 to the armature 43.

The plate spring 44 is fixed to the armature 43 at an outer peripheral side by fixing means such as a rivet and is fixed to the inner hub 45 at an inner peripheral side by fixing means such as a rivet. The plate spring 44 is an elastic member for displacing the armature 43 in a direction (the left direction in the drawing) as to be separated (released) from the friction surface of the rotor 42 when the supply of the electric current to the electromagnetic coil 41 is stopped, to return the armature 43 to an initial position thereof.

The inner hub 45 is an output portion of the viscous clutch 6 such that the input side thereof is connected to and driven by the armature 43 through the plate spring 44 and the output side is connected to and driven by the shaft 8 of the viscous heater 7 with a spline fitting connection.

Figure 4:
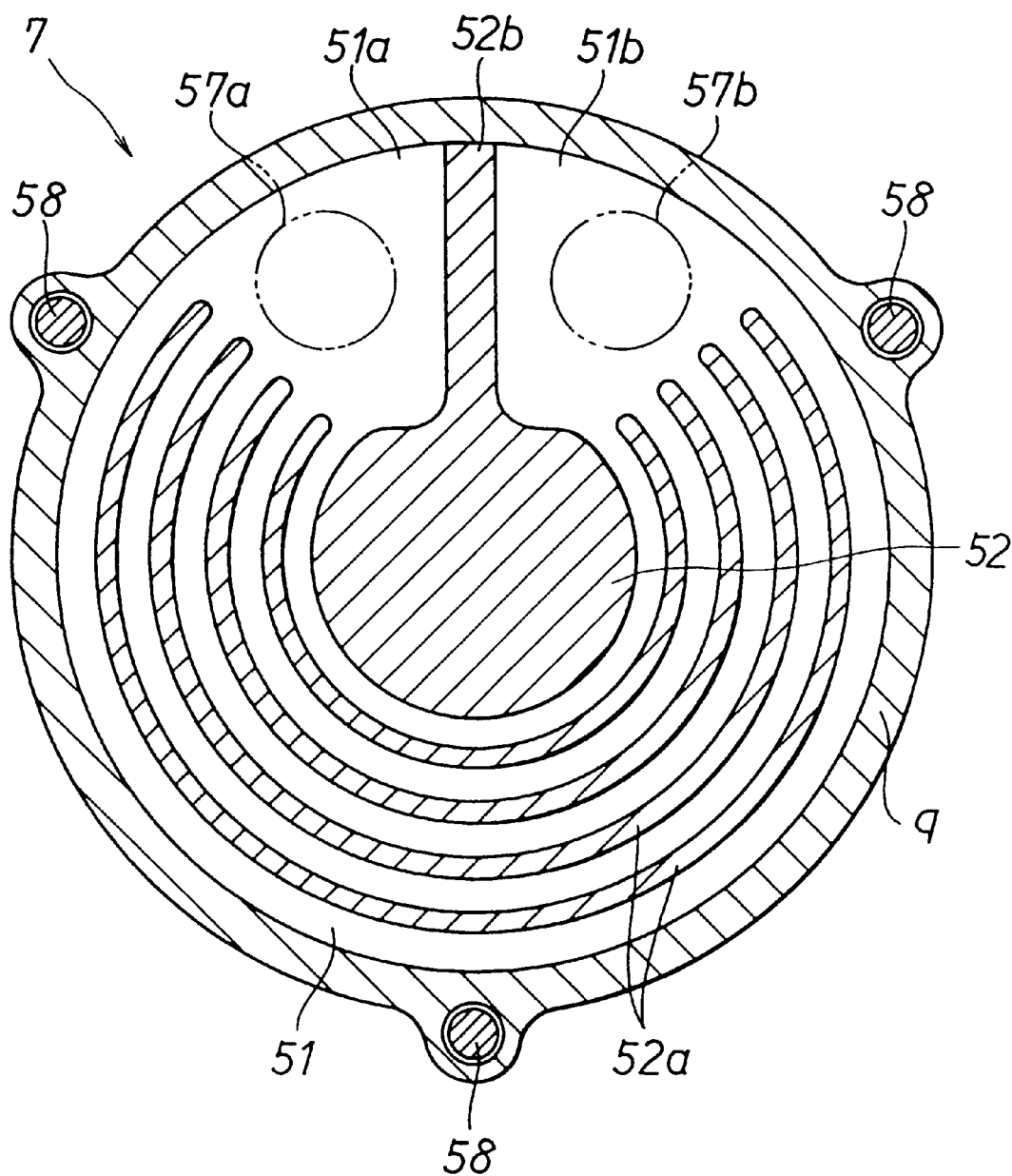
FIG. 4 is a cross sectional view showing a viscous heater in the first embodiment.

The viscous heater 7 is constructed, as shown in FIGS. 3 and 4, by the shaft 8 rotated by the engine E through the V-belt 4 and the viscous clutch 6, the housing 9 for rotatably supporting the shaft 8, a separator 52 for dividing an inner space of the housing 9 into a heat-generating chamber 50 and a cooling water passage 51, a rotor 53 rotatably disposed in the housing 9, and the like.

The shaft 8 is an input shaft which is fixedly fastened to the inner hub 45 of the viscous clutch 6 by fastening means 54 such as a bolt and rotates integrally with the armature 43. The shaft 8 is rotatably disposed in an inner periphery of the housing 9 with a bearing 55 and a sealing member 56. The sealing member 56 employs an oil-seal for preventing a leakage of the high-viscosity fluid.

The housing 9 is made of a metallic member such as an aluminum alloy. A cover 57 formed in a ring-shaped plate is fixedly fastened to a rear end of the housing 9 by fastening means 58 such as a bolt. On a surface where the housing 9 and the cover 57 are joined, there are attached the separator 52 and a sealing member 59. The sealing member 59 employs an oil-seal for preventing a leakage of high-viscosity fluid.

The separator 52 is a partition member which is made of a metallic member such as aluminum alloy, which is superior in heat conductivity. An outer peripheral portion of the separator 52 is sandwiched between a cylindrical portion of the housing 9 and a cylindrical portion of the cover 57. Between a front end surface of the separator 52 and a rear end surface of the separator 52, there is formed the heat-generating chamber 50 for sealing high-viscosity fluid (e.g., high-viscosity silicon oil) which generates heat when a shearing force is applied thereto.

Between a rear end surface of the separator 52 and the cover 57, there is formed the cooling water passage 51, which are liquid-tightly partitioned from the outside and in which the cooling water for cooling the engine E circulates. Further, on the rear end surface of the separator 52 at a lower side, there are integrally formed a plurality of fin portions 52a each having a substantially arcuate shape, for transmitting heat of the high-viscosity fluid to the cooling water efficiently.

Instead of the fin portions 52a, the rear end surface of the separator 52 may be formed in a convex and concave shapes or a heat transmission facilitating member such as a corrugated fin and a fine pin fin may be provided on an inner wall surface of the cover 57. Further, between the separator 52 and the rotor 53, there may be formed a labyrinth seal as the heat-generating chamber 50.

A partition wall 52b for partitioning an upstream side water passage 51a and a downstream side water passage 51b are formed to protrude from the rear end surface of the separator 52. To an outer wall portion of the cover 57, which is adjacent to the partition wall 52b, there are connected an inlet side cooling water pipe 57a into which the cooling water flows and an outlet side cooling water pipe 57b through which the cooling water flows out.

The rotor 53 is rotatably disposed in the heat-generating chamber 50 and is fixed to an outer periphery of the rear end portion of the shaft. On an outer peripheral surface or both side wall surfaces of the rotor 53, there are formed a plurality of groove portions (not shown). Between the adjacent groove portions, there is formed a protrusion portion. When the rotational driving force of the engine E is supplied to the shaft 8, the rotor 53 rotates integrally with the shaft 8 to generate a shearing force to the high-viscosity fluid sealed in the heat-generating chamber 50.

Figure 5:
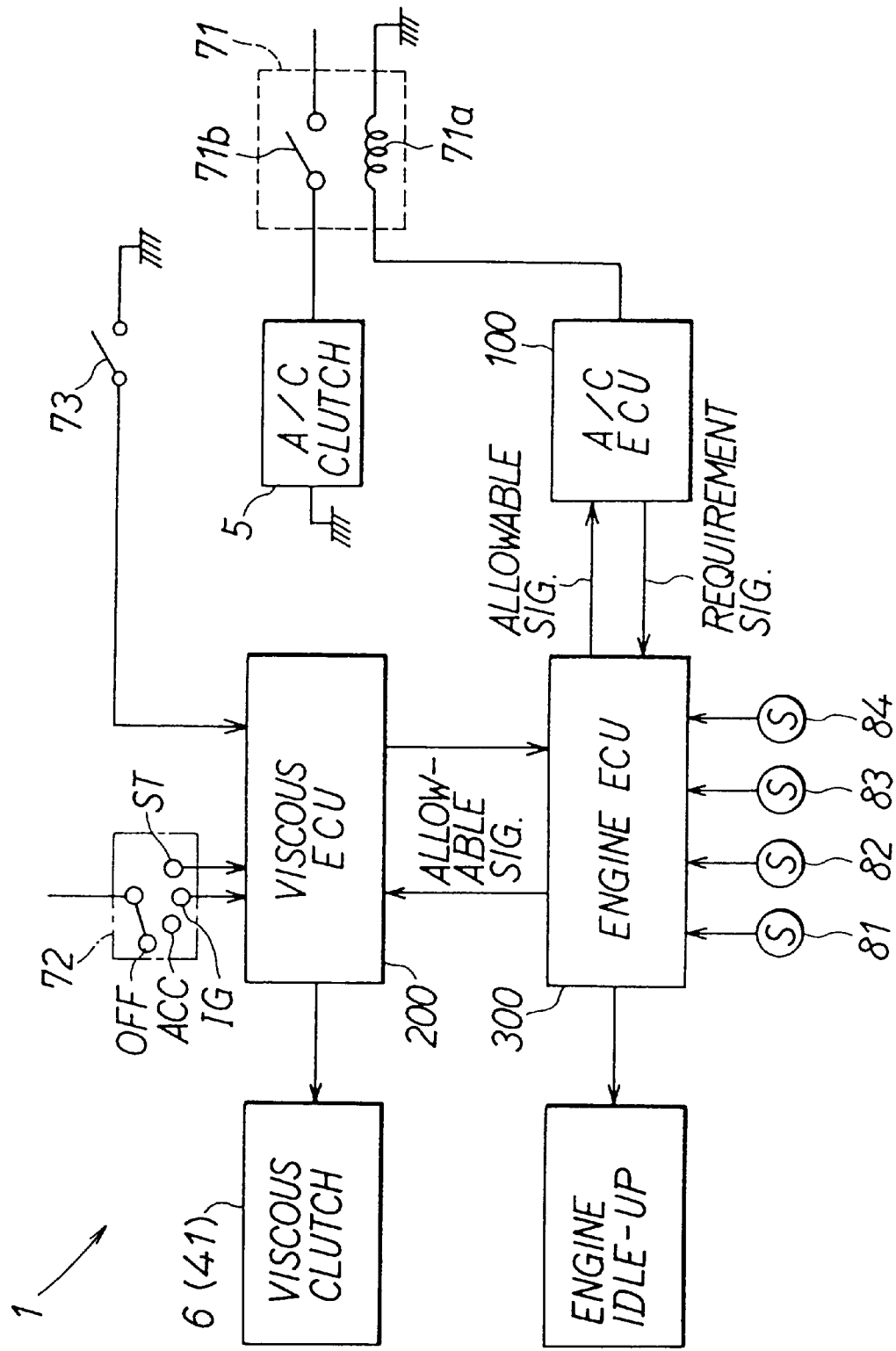
FIG. 5 is a block diagram showing an electric circuit of the air-conditioning apparatus for a vehicle in the first embodiment.

Next, the A/C ECU 100 will be described briefly with reference to FIGS. 1, 2, and 5. FIG. 5 shows an electric circuit of the air conditioning apparatus 1 for a vehicle.

The A/C ECU 100 is an electric circuit for an air-conditioning control system for performing a computer control for cooling and heating equipment such as the compressor 31 of the A/C unit 2. The A/C ECU 100 itself is a microcomputer in which a CPU, a ROM, and a RAM are incorporated.

The A/C ECU 100 performs an air-conditioning control for the passenger compartment by controlling an cooling and heating equipment such as the blower 22, the air-mixing damper 27, and an air-conditioning clutch relay 71, based on input signals from the various sensors and the engine ECU 300, and a pre-stored control program.

The air-conditioning clutch relay 71 is composed of a relay coil 71a and a relay switch 71b, and when an electric current is supplied to the relay coil 71a the relay switch 71b is closed. In this way, an electric current is supplied to the electromagnetic coil of the A/C clutch 5.

Next the viscous ECU 200 will be briefly described with reference to FIGS. 1, 2, 5 and 6.

The viscous ECU 200 is an electric circuit for an air-conditioning control system for performing a computer control for cooling and heating equipment such as the viscous heater 7. The viscous ECU 200 itself is a microcomputer in which a CPU, a ROM, and a RAM are incorporated.

The viscous ECU 200 performs an air-conditioning control for the passenger compartment by controlling an cooling and heating equipment such as the electromagnetic coil 41 of the viscous clutch 6, based on input signals from an ignition switch 72, a viscous switch 73, and the engine ECU 300, and a pre-stored control program.

The ignition switch 71 includes each terminal of OFF, ACC, ST and IG. The terminal of ST is a starter electric current supply terminal for supplying an electric current to a starter and outputs a stator electric current supply signal to the viscous ECU 200.

The viscous switch 73 is for preferring a heating operation for the passenger compartment by using the viscous heater 7. When the viscous switch 73 is turned on, a heating preference signal is output to the A/C ECU 100. The viscous switch 73 is an economical fuel consumption preference switch for giving an improvement of the fuel consumption rate (fuel economy) priority. When the viscous switch 73 is turned off, a fuel consumption preference signal is output to the viscous ECU 200.

Figure 6:
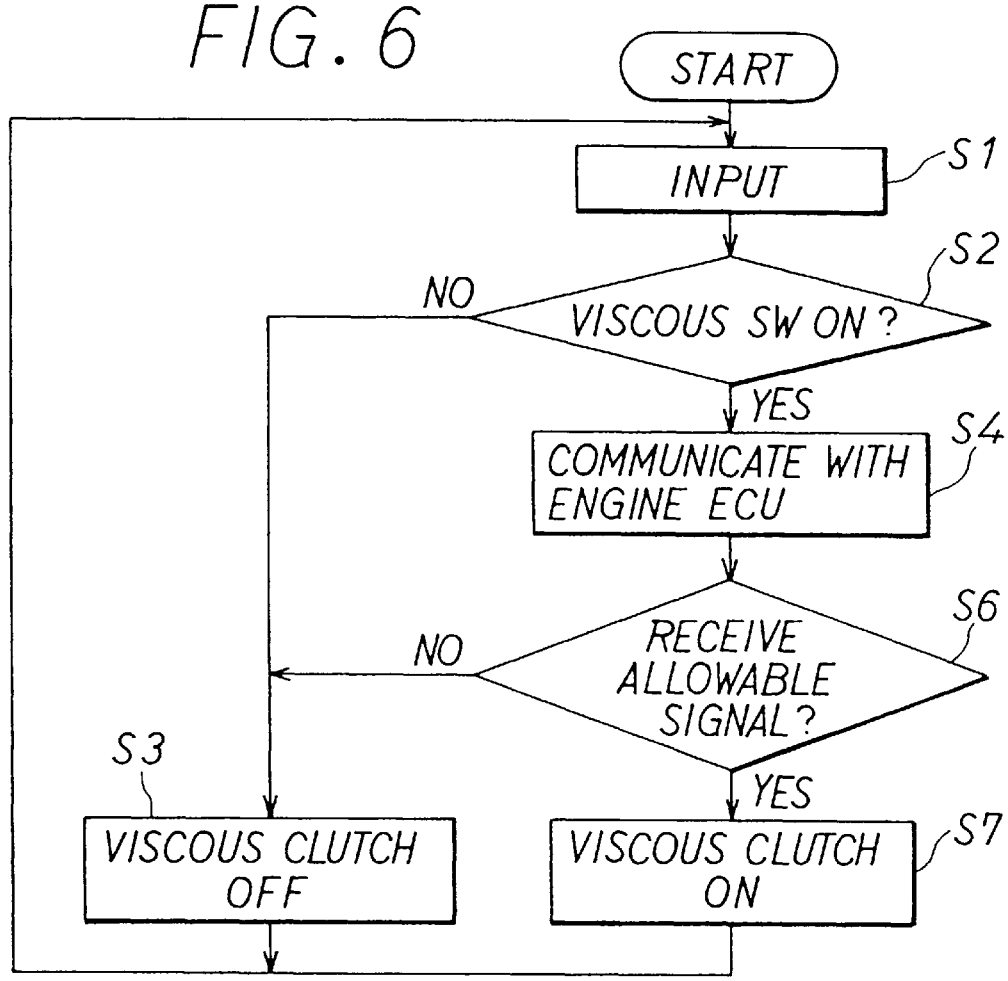
FIG. 6 is a flow chart of a control program of a viscous ECU in the first embodiment.

Next, a control of the viscous heater 7 of the viscous ECU 200 will be described with reference to FIGS. 1–6. FIG. 6 shows a flow chart of a control program of the viscous ECU 200.

Firstly, various kinds of sensor signals and switch signals are read (rotation detecting means: step S1).

Next, it is determined whether or not the viscous switch 73 is set on. That is, it is determined whether or not the heating preference signal or the economical fuel consumption preference switch is input (viscous switch determining means: step S2). When the determination at step S2 is "NO", it is not necessary to heat the passenger compartment and a priority is given on the improvement of the fuel consumption rate of the engine E. Therefore, the electromagnetic coil 41 of the viscous clutch 6 is turned off, i.e., the supply of the electric current to the electromagnetic coil 41 is stopped, and the rotor 53 of the viscous heater 7 is stopped rotating (step S3). Next, it proceeds to the process at step S1.

On the other hand, when the determination at step S2 is "YES", it performs a communication with (transmits a signal to and receives a signal from) the E/G ECU 300 (step S4). Next, it is determined whether an allowable signal for allowing the electromagnetic coil 41 of the viscous clutch 6 to be turned on is received from the E/G ECU 300 (allowable signal determining means: step S5). When the determination is "NO", it proceeds to the process at step S3, and the electromagnetic coil 41 of the viscous clutch 6 is turned off.

When the determination at step S5 is "YES", the electromagnetic coil 41 of the viscous clutch 6 is turned on to compensate an insufficiency of the heating capacity in the maximum heating operation, i.e., an electric current is supplied to the electromagnetic coil 41 of the viscous clutch 6 so that the rotor 53 of the viscous heater 7 is rotated (viscous heater actuating means: step S6). Next, it proceeds to the process at step S1.

Next, the E/G ECU 300 will be briefly described with reference to FIGS. 1, 5 and 7.

The E/G ECU 300 is an electric circuit for an engine control system for performing a computer control of the engine E. The E/G ECU 300 itself is a microcomputer in which a CPU, a ROM, and a RAM are incorporated.

The E/G ECU 300 controls an engine control of an idling rotational speed control (idle-up control) of the engine E, a fuel injection amount, a fuel injection timing, an intake air throttle, a supply of electric current to a glow plug, and the like, based on signals input from a cooling water temperature sensor 81, a vehicle speed sensor 82, an engine rotational speed sensor 83, a throttle opening sensor 84, and the viscous ECU 200, and the pre-stored control program (see FIG. 7). The E/G ECU 300 also transmits signals required for processes of the viscous ECU 200 to the viscous ECU 200.

The cooling water temperature sensor 81 employs, for example, a thermistor. The cooling water temperature sensor 81 is cooling water temperature detecting means for detecting a temperature of the cooling water in the cooling water circuit 10 (in this embodiment, a temperature of the cooling water in the outlet side cooling water pipe 57b of the cooling water passage 51 of the viscous heater 7), and outputs a cooling water temperature detection signal to the E/G ECU 300.

The vehicle speed sensor 82 is accelerating state detecting means of the present invention, and employs, for example, a reed switch type vehicle speed sensor, a photo-electric switch type speed sensor, or a MRE (Magnetic Resistance Element) type vehicle sensor. The vehicle speed sensor 82 is vehicle speed detecting means for detecting a speed of the vehicle and outputs a vehicle speed signal to the E/G ECU 300.

The engine rotational speed sensor 83 is accelerating state detecting means of the present invention, and is engine rotational speed detecting means for detecting a rotational speed of the crankshaft 11 of the engine E, relative to the rotor 53 of the viscous heater 7, and outputs an engine rotational speed signal to the E/G ECU 300.

The throttle opening sensor 84 is accelerating state detecting means of the present invention, and is throttle opening degree detecting means for detecting an opening degree of the throttle valve disposed in an intake pipe of the engine E and outputs a throttle opening signal to the E/G ECU 300.

Next, a viscous heater control of the E/G ECU 300 will be briefly described with reference to FIGS. 1, 5, 7 and 11. FIG. 7 shows a flow chart of a control program of the E/G ECU 300.

Firstly, various kinds of sensor signals and switch signals are input (accelerating state detecting means, vehicle speed detecting means, throttle opening degree detecting means, engine rotational speed detecting means, cooling water temperature detecting means: step S11).

Next, it is determined whether the electromagnetic coil 41 of the viscous clutch 6 is set on or off according to a characteristics graph (see FIG. 8) of the viscous heater control based on the cooling water temperatures pre-stored in a memory circuit (e.g., ROM). That is, it is determined whether or not the cooling water temperature detected by the cooling water temperature sensor 81 is higher or lower than the set cooling water temperature (set value) (cooling water temperature detecting means: step S12).

Figure 8:
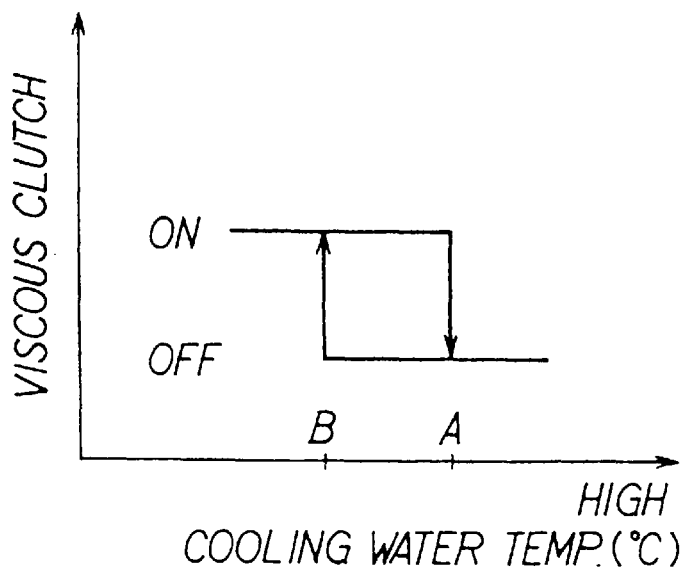
FIG. 8 is a characteristic graph of the engine ECU, showing a viscous heater control based on a temperature of cooling water in the first embodiment.

More specifically, as shown in the characteristics graph of FIG. 8, a hysteresis is given between a set cooling water temperature (A: 80° C., for example) and another set cooling water temperature (B: 70° C. for example). When the temperature of the cooling water is equal to or higher than the set cooling water temperatures i.e., the temperature of the cooling water is high, the electromagnetic coil 41 is turned off, whereas when the temperature of the cooling water is equal to or lower than the set cooling waters i.e., the temperature of the cooling water is low, the electromagnetic coil 41 is turned on. The hysteresis is given to the characteristics graph of FIG. 8; however, the hysteresis may not be given.

When the determination at step S12 is "the high temperature", an unallowable signal for not allowing the electromagnetic clutch 41 of the viscous clutch 6 to be turned on is transmitted to the viscous ECU 200 (unallowable signal transmitting means: step S13). Next, it proceeds to a process at step S11. The process at step S13 may be omitted. The time period during which the electromagnetic coil 41 of the viscous clutch 6 is turned off by the unallowable signal is continued for 0.5–2.5 seconds, for example.

When the determination at step S12 is "the low temperature", it is determined whether or not an accelerating state of the vehicle is detected. Firstly, it is determined whether the electromagnetic coil 41 of the viscous clutch 6 is set on or off according to a characteristics graph (see FIG. 9) of the viscous heater control based on the speed of the vehicle, pre-stored in a memory circuit (e.g., ROM). That is, it is determined whether or not the vehicle speed detected by the vehicle speed sensor 82 is higher than a set vehicle speed (set value) (vehicle speed determining means: step S14). When the determination at step S14 is "NO", it proceeds to a process at step S16.

Figure 9:
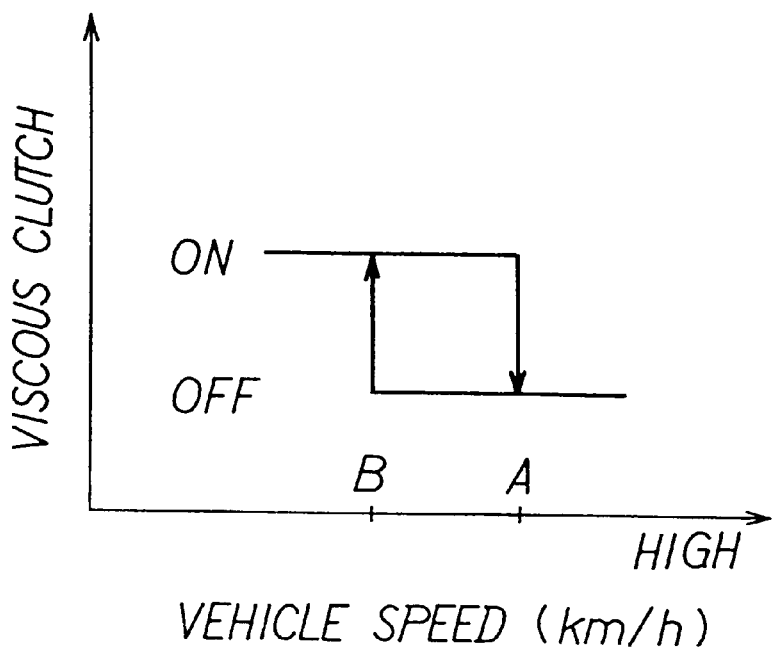
FIG. 9 is a characteristic graph of the engine ECU, showing a viscous heater control based on a vehicle speed in the first embodiment.

More specifically, as shown in the characteristics graph of FIG. 9, a hysteresis is given between a set vehicle speed (A: 40 km/h, for example) and another set vehicle speed (B: 30 km/h, for example). When the vehicle speed is equal to or higher than the set vehicle speed, the electromagnetic coil 41 is turned off, whereas when the vehicle speed is equal to or lower than the set vehicle speed, the electromagnetic coil 41 is turned on. The hysteresis is given to the characteristics graph of FIG. 9; however, the hysteresis may not be given.

When the determination at step S14 is "YES", it is determined whether the electromagnetic coil 41 of the viscous clutch 6 is set on or off according to a characteristics graph (see FIG. 10) of the viscous heater control based on the engine rotational speeds pre-stored in a memory circuit (e.g., ROM). That is, it is determined whether or not the engine rotational speed detected by the engine rotational speed sensor 83 is higher than a set engine rotational speed (set value) (engine rotational speed determining means: step S15). When the determination is "YES", because a load of the engine E is high, it proceeds to the process at step S13, and an unallowable signal is transmitted to the viscous ECU 200. On the other hand, the determination at step S15 is "NO", because a load of the engine E is low, it proceeds to a process at step S17.

Figure 10:
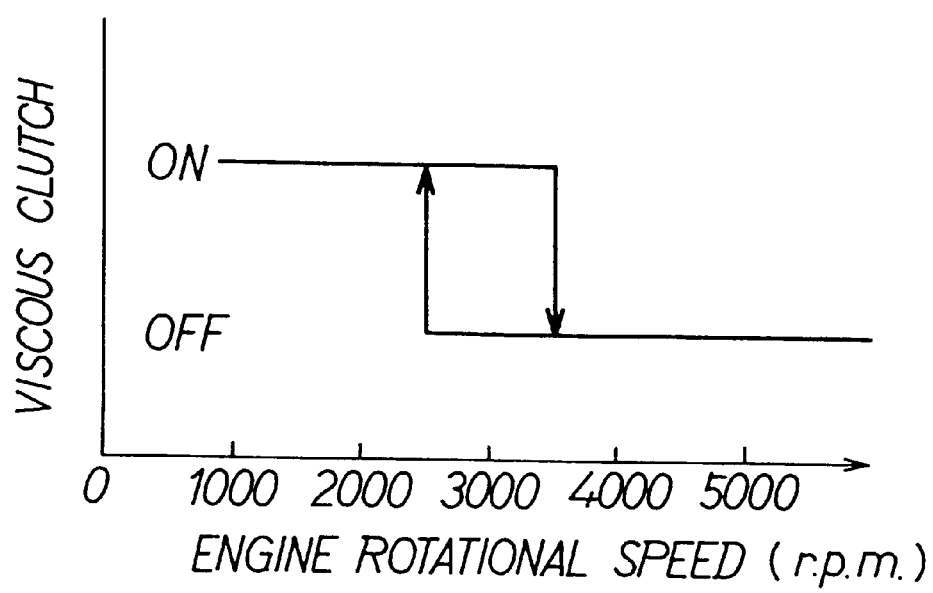
FIG. 10 is a characteristic graph of the engine ECU, showing a viscous heater control based on an engine rotational speed in the first embodiment.

More specifically as shown in the characteristics graph of FIG. 10, a hysteresis is given between a set engine rotational speed (A: 3500 r.p.m., for example) and another set engine rotational speed (B: 2500 r.p.m., for example). When the engine rotational speed increases to be equal to or higher than the set engine rotational speed, the electromagnetic coil 41 is turned off, whereas when the engine rotational speed decreases to be equal to or lower than the set engine rotational speeds the electromagnetic coil 41 is turned on.

The hysteresis is given to the characteristics graph of FIG. 10; however, the hysteresis may not be given.

When the determination at step S14 is "NO", it is determined whether the electromagnetic coil 41 of the viscous clutch 6 is set on or off according to a characteristics graph (see FIG. 11) of the viscous heater control based on the throttle opening degrees pre-stored in a memory circuit (e.g., ROM). That is, it is determined whether or not the throttle opening degree detected by the throttle opening sensor 84 increases to be higher than a set throttle opening degree (set value) (throttle opening degree determining means : step S16). When the determination is "YES", i.e., when it is determined that the vehicle speed is less than 40 km/h, for example, and the throttle opening degree is large, and that the vehicle is accelerating, it proceeds to the process at step S13, and an unallowable signal is transmitted to the viscous ECU 200.

Figure 11:
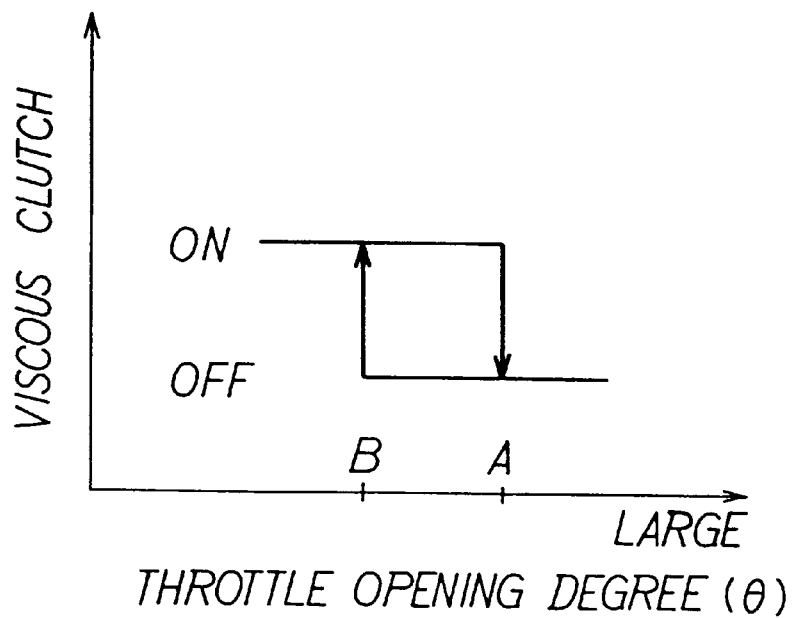
FIG. 11 is a characteristic graph of the engine ECU, showing a viscous heater control based on a throttle opening degree in the first embodiment.

More specifically, as shown in the characteristics graph of FIG. 11, a hysteresis is given between a set throttle opening degree (A: 65°/90°, for example) and another set throttle opening degree (B: 65°/90°, for example). When the throttle opening degree increases to be equal to or higher than the set throttle opening degree, the electromagnetic coil 41 is turned off, whereas when the throttle opening degree decreases to be equal to or lower than the set throttle opening degrees the electromagnetic coil 41 is turned on. The hysteresis is given to the characteristics graph of FIG. 11; however, the hysteresis may not be given.

When the determination at step S16 is "NO", i.e., it is determined that the vehicle is not accelerating, a control that an idling rotational speed is increased from a normal rotational speed (e.g., 600 r.p.m.) to a higher target rotational speed (e.g., 1050 r.p.m.) stepwise, so-called idle-up control, is performed (step S17).

When a predetermined time (e.g., 400 msec.) has passed since the idle-up control is performed at step S17, an allowable signal for allowing the electromagnetic clutch 41 of the viscous clutch 6 to be turned on is transmitted to the viscous ECU 200 (allowable signal transmitting means: step S18). Next, it proceeds to the process at step S11.

Next an operation of the air-conditioning apparatus 1 according to the embodiment will be briefly described with reference to FIGS. 1–11.

When the engine E starts, the crankshaft 11 rotates, and the rotational driving force of the engine E is transmitted to the rotor 42 through the V-belt 4. When the viscous switch 73 is turned on, in a case where the cooling water temperature is lower than the set cooling water temperature, the vehicle speed is equal to or higher than 40 km/h, for example, and the engine rotational speed is less than 3500 r.p.m., for example, or a case where a driving load of the engine E is low, such as while the vehicle is not accelerating, the electromagnetic coil 41 of the viscous clutch 6 is turned on. That is, in a case where a driver does not perform a steering operation when the vehicle is stopped, the electromagnetic coil 41 is turned on, the armature 43 is attracted to the friction surface of the rotor 42 with magnetomotive force of the electromagnetic coil 41 to transmit the rotational driving force of the engine E to the inner hub 45 and the shaft 8.

In this way, since the rotor 53 rotates integrally with the shaft 8, a shearing force is applied to the high-viscosity fluid in the heat-generating chamber 50 to generate heat. Therefore, when the cooling water heated in the water jacket 13 of the engine E passes through the cooling water passage 51, the cooling water is heated while absorbing heat generated by the high-viscosity fluid through the fin portion 52a. The cooling water heated by the viscous heater 7 is supplied to the front heater core 15 so that the heating operation of the passenger compartment is performed with a large heating capacity.

Further, in a case where the electromagnetic coil of the A/C clutch 5 of the compressor 31 is turned on, a case where the temperature of the cooling water is higher than the set cooling water temperature, the vehicle speed is equal to or higher than 40 km/h, for example, and the engine rotational speed is equal to or higher than 3500 r.p.m., for example, or a case where the driving load of the engine E is high, such as while the vehicle is accelerating, the electromagnetic coil 41 is turned off. Therefore, the armature 43 is not attracted to the friction surface of the rotor 42, and the rotational driving force of the engine E is not transmitted to the inner hub 45 and the shaft 8. In this way, the rotor 42 races simply, and the shaft 8 and the rotor 53 do not rotate. Therefore, a large driving load is not applied to the engine E, the V-belt 4, and the viscous clutch 6.

As described above, in this embodiment, while the vehicle is accelerating, even if the viscous switch 73 is turned on, and further the temperature of the cooling water is lower than the set cooling water temperature, the electromagnetic coil of the A/C clutch 5 is turned off, so that a shearing operation of the high-viscosity fluid by the rotor 53 is not performed. Therefore, a driving load applied to the V-belt 4 and the viscous clutch 6 is greatly reduced. As a result, when a driver desires an acceleration and steps on an acceleration pedal, an accelerating state suitable for an intention of the driver can be obtained. Therefore, a driveability improves, and an emission (NOx) lowers. A noise such as a belt chattering noise, generated by a slip of the V-belt 4 or the viscous clutch 6 can be suppressed and an increase of a fuel consumption rate of the engine E can be suppressed, so that a fuel economical performance (running cost) can be improved.

In this embodiment, when the vehicle is not in an accelerating state, the electromagnetic coil 41 of the viscous clutch 6 is turned on after the idling rotational speed is increased to prevent an engine stall In this way, the viscous heater 7 is operated to increase a temperature of the cooling water flowing into the heater core 15, and the temperature of the cooling water in the cooling water circuit 10 can be maintained approximately at a predetermined cooling water temperature (e.g., 80° C.). Therefore, a radiating amount of the heater core 15 is increased, and air heated sufficiently while passing through the heater core 15 can be blown into the passenger compartment. Accordingly, it is possible to prevent the heating capacity for the passenger compartment from being lowered at a time of a steering operation when the vehicle is stopped.

A second embodiment of the present invention will be described.

Figure 12:
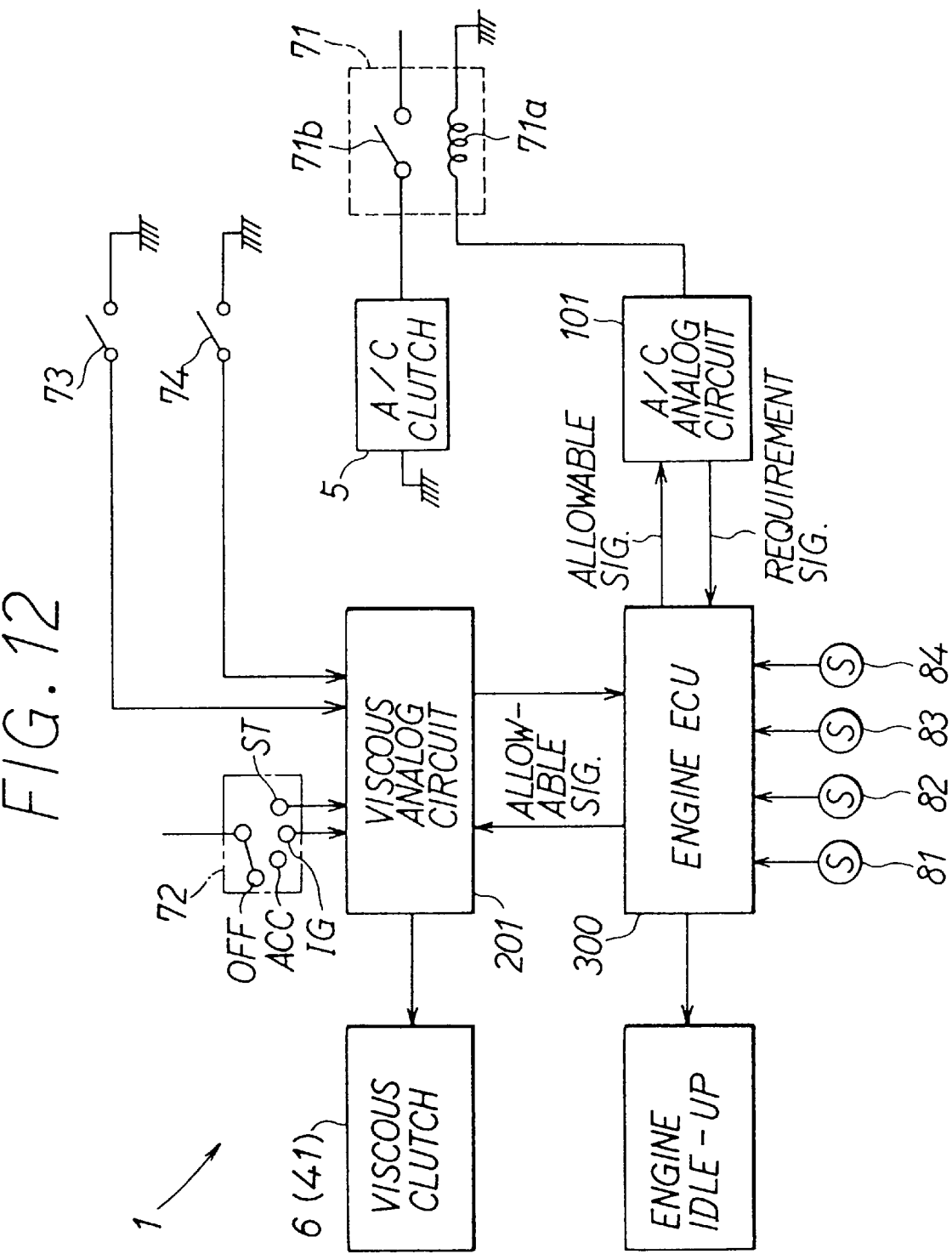
FIG. 12 is a block diagram showing an electric circuit of the air-conditioning apparatus for a vehicle in a second embodiment of the present invention.

FIG. 12 shows a second embodiment of the present invention and is a view showing an electric circuit of the air conditioning apparatus for a vehicle.

In this embodiment, a manual air conditioning system is employed as the air conditioning apparatus. In the electric circuit of the air conditioning apparatus 1 for a vehicle, instead of the viscous ECU 200, there are provided an air-conditioning analog circuit 101 (hereinafter referred to as "A/C analog circuit") for performing an analog control on the A/C unit 2 and a viscous analog circuit (heating control means) 201 for performing an analog control on the viscous clutch 6.

To an input portion of the A/C analog circuit 101, there are connected the E/G ECU 300, various kinds of sensors, and the like. To an output portion of the A/C analog circuit 101, there are connected the blower 22, the air-mixing damper 27, the air-conditioning clutch relay 71, and the E/G ECU 300.

To an input portion of the viscous analog circuit 201, there are connected a ST terminal and an IG terminal of the ignition switch 72, the viscous switch 73, an acceleration cut switch 74, and the E/G ECU 300. To an output portion of the viscous analog circuit 201, there are connected the E/G ECU 300 and the electromagnetic coil 41 of the viscous clutch 6. The acceleration cut switch 74 is accelerating state detecting means for detecting an accelerating state of the vehicle. The acceleration cut switch 74 is set on (closed) when an accelerating state of the vehicle is detected and is set off (opened) when an accelerating state of the vehicle is not detected.

Further, when receiving an ON signal transmitted in a case where the viscous analog circuit 201 determines that the viscous clutch 6 is set on, the E/G ECU 300 performs a calculation or determination based on the engine rotational speed, the vehicle speed, the throttle opening degree, or the cooling water temperature, and outputs to the viscous analog circuit 201 an allowable signal or unallowable signal for allowing or not allowing the A/C unit 2 or the viscous heater 7 to be turned on.

In this embodiment, at a time when the acceleration cut switch 74 is turned on (closed), the electromagnetic coil 41 of the viscous clutch 6 is turned off by the viscous analog circuit 201. Therefore, a shearing operation of the high-viscosity fluid by the rotor 53 is not performed, and a driving load applied to the V-belt 4 and the viscous clutch 6 is greatly reduced. In this ways the effects similar to those in the first embodiment can be obtained.

A third embodiment of the present invention will be described with reference to FIGS. 13 to 15.

Figure 13:
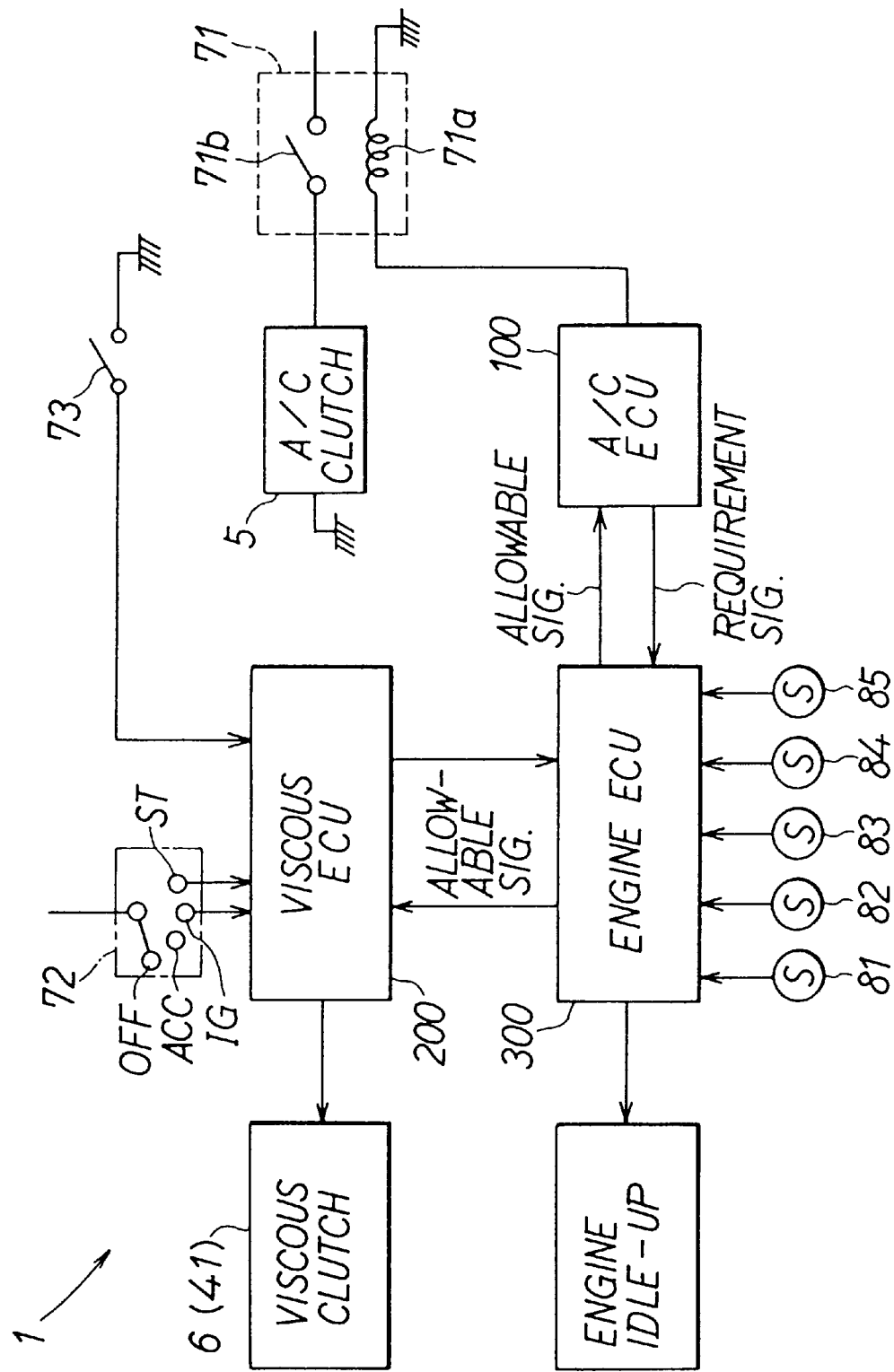
FIG. 13 is a block diagram showing an electric circuit of the air-conditioning apparatus for a vehicle in a third embodiment of the present invention.
Figure 14:
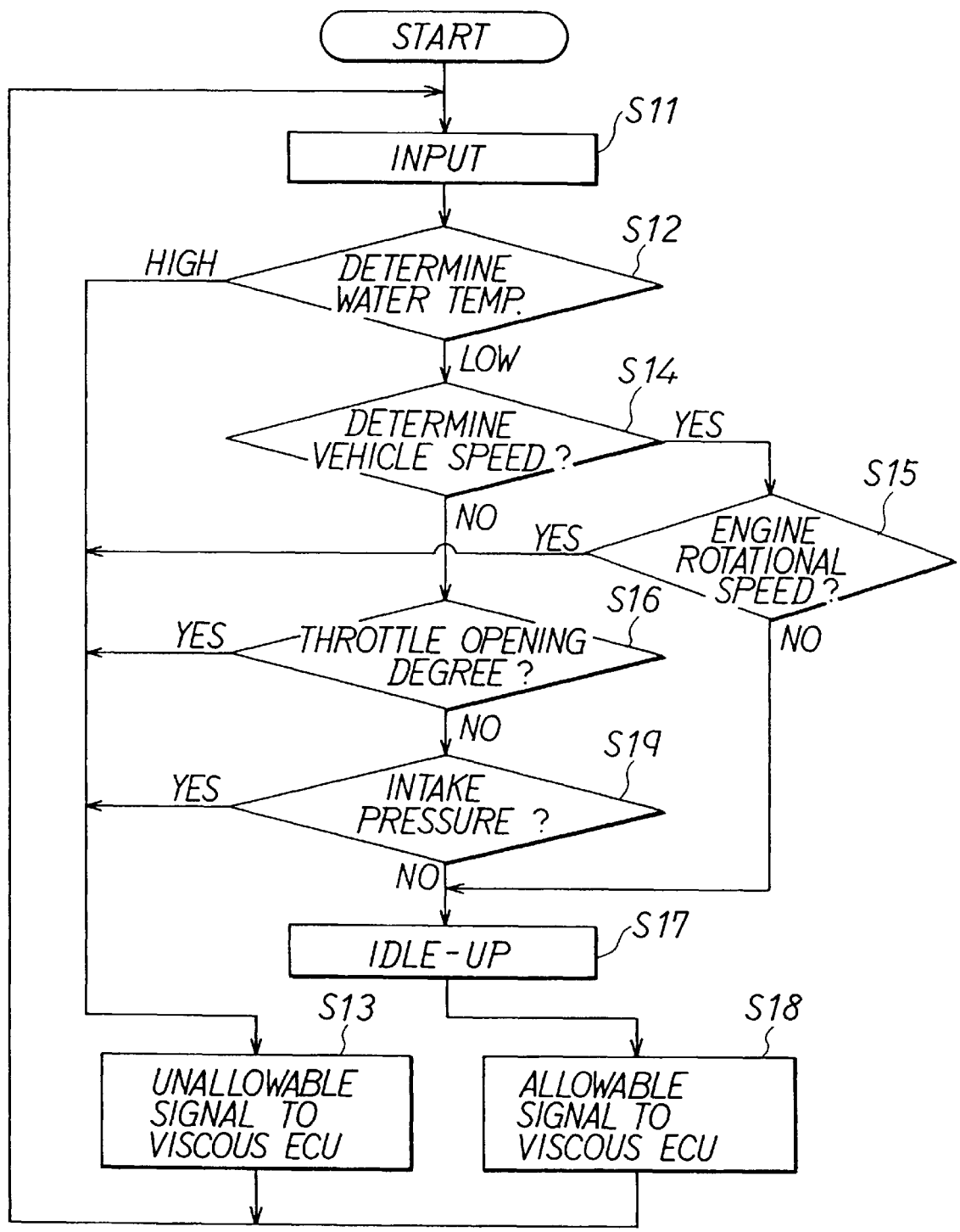
FIG. 14 is a flow chart of a control program of an engine ECU in the third embodiment.

FIG. 13 shows the third embodiment of the present invention and is a view showing an electric circuit of the air conditioning apparatus for a vehicle.

In this embodiment, to an input portion of the E/G ECU 300, there are connected the cooling water temperature sensor 81, the vehicle speed sensor 82, the engine rotational speed sensor 83, the throttle opening sensor 84, an intake pipe pressure sensor 85, and the viscous ECU 200. The intake pressure sensor 85 is engine load detecting means of the present invention, and is intake pipe pressure detecting means for detecting a pressure in an intake manifold (intake pipe negative pressure) and outputs an intake pressure signal to the E/G ECU 300.

Next, a viscous heater control of the E/G ECU 300 will be described briefly with reference to FIGS. 13 to 15. FIG. 14 is a flow chart showing a control program of the E/G ECU 300. The calculations or processes similar to those in the first embodiment are shown by the same reference numerals and description thereof is omitted.

When the determination at step S16 is "NO", it is determined whether the electromagnetic coil 41 of the viscous clutch 6 is set on or off according to a characteristics graph (see FIG. 15) of the viscous heater control based on the intake pressure, pre-stored in a memory circuit (e.g., ROM). That is, it is determined whether or not the intake pressure detected by the intake pressure sensor 85 increases to be higher than a set intake pressure (set value) (engine load determining means, intake pressure determining means: step S19).

Figure 15:
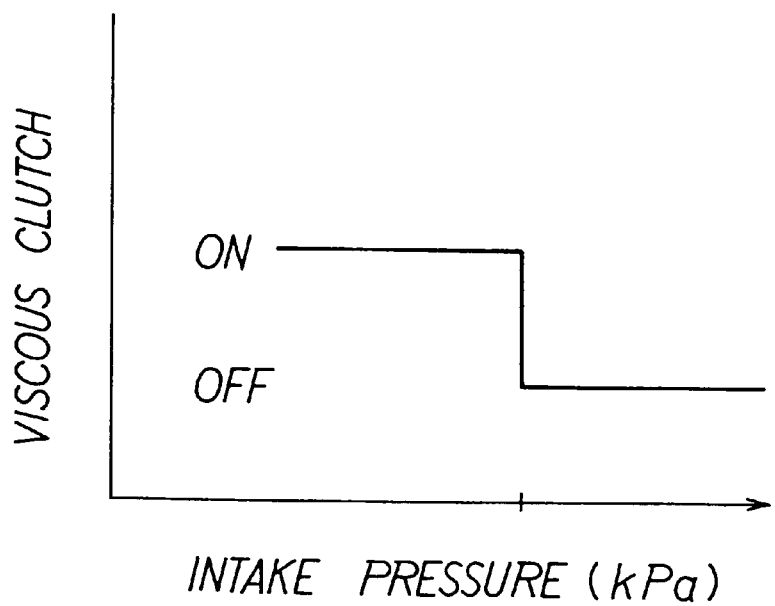
FIG. 15 is a characteristic graph of the engine ECU, showing a viscous heater control based on an intake pressure in the third embodiment.

More specifically, as shown in the characteristics graph of FIG. 15, when the intake pressure increases to be equal to or higher than the set intake pressure (e.g., −25 kPa to −35 kPa), the electromagnetic coil 41 is turned off, whereas when the intake pressure decreases to be equal to or lower than the set intake pressures the electromagnetic coil 41 is turned on.

When the determination at step S19 is "YES", the load of the engine is high. Therefore, it proceeds to the process at step S13, and an unallowable signal is transmitted to the viscous ECU 200. On the other hand, when the determination at step S19 is "NO", the load of the engine is low. Therefore, it proceeds to the process at step S17, when a predetermined time (e.g., 400 msec.) has passed since the idle-up control is performed at step S17, an allowable signal for allowing the electromagnetic clutch 41 of the viscous clutch 6 to be turned on is transmitted to the viscous ECU 200.

A fourth embodiment of the present invention will be described.

Figure 16:
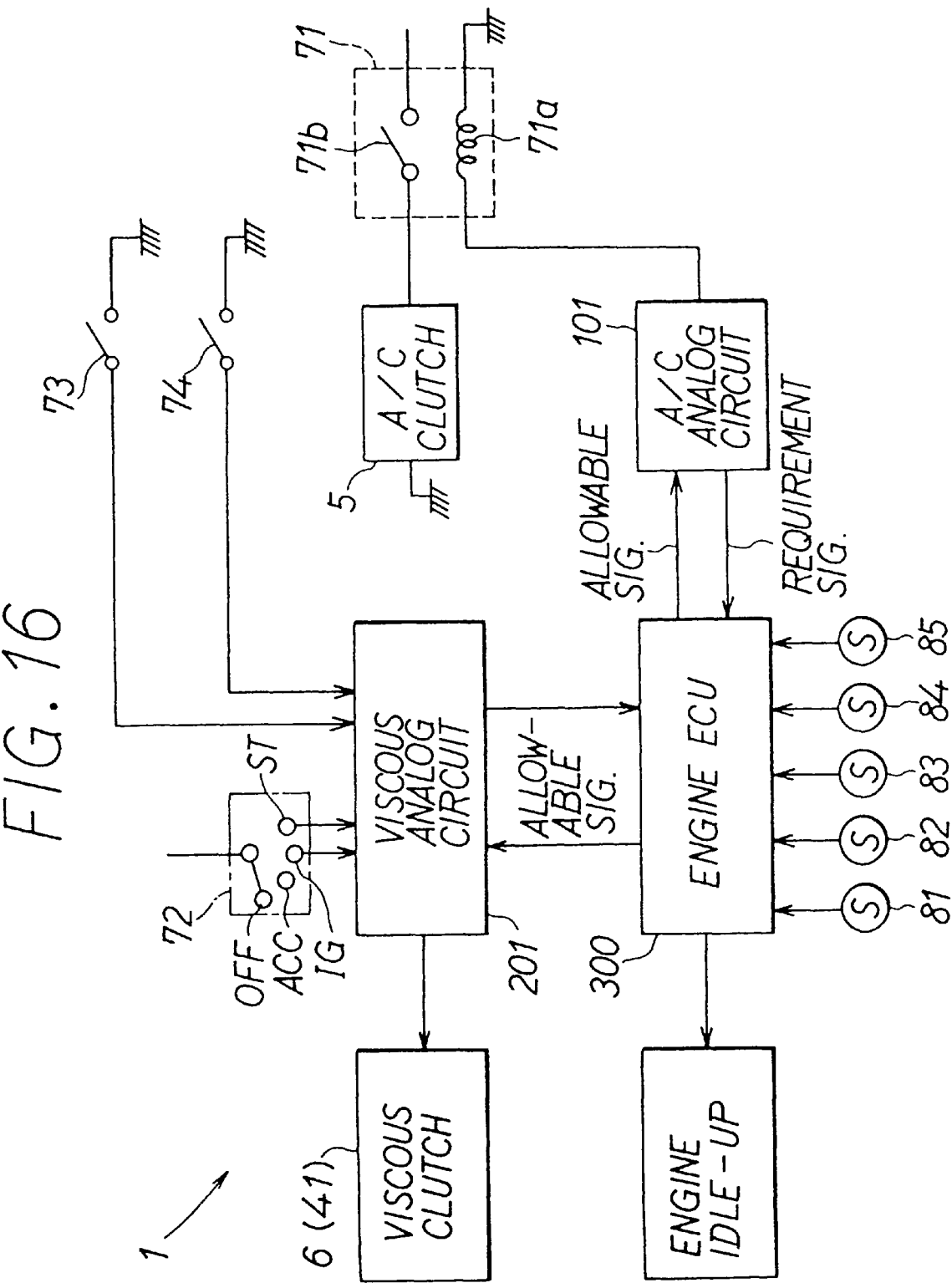
FIG. 16 is a block diagram showing an electric circuit of the air-conditioning apparatus for a vehicle in a fourth embodiment of the present invention.

FIG. 16 shows the fourth embodiment of the present invention and is a view showing an electric circuit of the air conditioning apparatus for a vehicle.

In this embodiment, a manual air conditioning system is employed as the air conditioning apparatus. In the electric circuit of the air conditioning apparatus 1 for a vehicle, instead of the viscous ECU 200 in third embodiment, there are provided an A/C analog circuit 101 and a viscous analog circuit (heating control means) 201.

In this embodiment, at a time when the acceleration cut switch 74 is turned on (closed), the electromagnetic coil 41 of the viscous clutch 6 is turned off by the viscous analog circuit 201. Therefore, a shearing operation of the high-viscosity fluid by the rotor 53 is not performed, and a driving load applied to the V-belt 4 and the viscous clutch 6 is greatly reduced. In this way, the effects similar to those in the third embodiment can be obtained.

In each of the above-described embodiments, the V-belt 4 and the viscous clutch 6 are connected to and driven by the crankshaft 11 of the engine E to drive the shaft 8 of the viscous heater 7; however, the viscous clutch 6 may be connected directly to the crankshaft 11 of the engine E to drive the shaft 8 of the viscous heater 7. Further, between the crankshaft 11 of the engine E and the viscous clutch 6 or between the viscous clutch 6 and the shaft 8 of the viscous heater 7, there may be connected a transmitting mechanism (driving force transmitting means) such as a gear transmission having at least one stage gear and a V-belt type non-stage transmission. As clutch means, there may be employed the other clutch means such as a hydraulic type multi disc clutch.

Further, the viscous clutch 6 is eliminated, and a V-belt type non-stage transmission may be driven by and connected to the crankshaft 11 of the engine E. In this case, when it is detected that the vehicle is accelerating, a pulley ratio between an input pulley and an output pulley of the V-belt type non-stage transmission is optimized, so that the load of the engine E is minimized while the viscous heater 7 is operating.

In each of the above-described embodiments, the V-belt 4 is hung on both of the A/C clutch 5 and the viscous clutch 6; however, the V-belt 4 may be hung on only a hydraulic pump P and the viscous clutch 6. Further, the V-belt 4 may be hung on an auxiliary equipment for an engine, such as a blower apparatus for blowing cool air toward a radiator, a hydraulic pump for supplying hydraulic fluid to an automatic transmission, a hydraulic pump for supplying lubricating oil to the engine E or the transmission, with the viscous clutch 6. Further, the auxiliary equipment and the viscous clutch may be separately connected to the crankshaft of the engine E by a plurality of V-belts. Instead of the V-belt 4, a plurality of transmitting means such as a chain may be employed.

In each of the above-described embodiments, a water-cooled diesel engine is employed as the engine E; however, the other water-cooled internal combustion engines (water-cooled engine) such as a gasoline engine may be employed. Further, the compressor 31 and the viscous heater 7 may be actuated by using the other driving source such as a water-cooled engine which is not used for a heat source apparatus for heating operation, and an air-cooled engine.

In each of the above-described embodiments, the present invention is applied to an air conditioning apparatus for a vehicles capable of performing a heating operation and a cooling operation for the passenger compartment; however, the present invention may be applied to an air-conditioning apparatus for a vehicle, capable of performing only a heating operation for the passenger compartment. The present invention is used not only for a heating apparatus for a vehicle, may be used also for an engine warm-up apparatus for performing a quick warm-up operation of the engine E.

As a method for detecting an accelerating state of the vehicle, an acceleration in a front-rear direction of the vehicle is calculated from a function of the vehicle or a function of the vehicle speed and a throttle opening degree, and an accelerating state may be detected by determining whether or not the acceleration is equal to or higher than a set acceleration. In a case where a vehicle is provided with an acceleration sensor for detecting an acceleration in a front direction of the vehicle, an accelerating state may be detected by determining whether or not the acceleration detected by the acceleration sensor is equal to or higher than a set acceleration.

Although the present invention has been fully described in connection with the preferred embodiments thereof with reference to the accompanying drawings, it is to be noted that various changes and modifications will become apparent to those skilled in the art. Such changes and modifications are to be understood as being included within the scope of the present invention as defined in the appended claims.

What is claimed is:

1. A heating apparatus for a vehicle having an engine for running said vehicle, said heating apparatus comprising:

a heating heat exchanger for heating air by heat-exchanging between a thermal medium and the air;

a heat-generating unit using a shearing force, said heat-generating unit having a rotor which rotates when a rotational driving force of said engine is applied thereto, a heat-generating chamber for sealing therein viscous fluid which generates heat when a shearing force generated by a rotational driving force or said rotor is applied thereto, said heat-generating unit being for heating the thermal medium circulating between said engine and said heating heat exchanger by generated heat of the viscous fluid in said heat-generating chamber;

a driving force transmitting unit having a clutch for intermitting a transmission of the rotational driving force from said engine to said rotor, said driving force transmitting unit being for transmitting a rotational driving force of said engine to said rotor through said clutch;

accelerating state detecting means for detecting an accelerating state of said vehicle; and heating control means for controlling said clutch to reduce a load of said engine when said accelerating state detecting means detects an accelerating state of said vehicle, wherein:

said heating control means includes a vehicle speed sensor for detecting a vehicle speed of said vehicle; and said heating control means controls said clutch to stop the transmission of the rotational driving force from said engine to said rotor when the vehicle speed is less than a predetermined speed and the accelerating state is detected and said heating control means controls said clutch to transmit the rotational driving force from said engine to said rotor when the vehicle speed is less than the predetermined speed and the accelerating state is not detected or when the vehicle speed is more than the predetermined speed.

2. A heating apparatus according to claim 1, wherein said heating control means controls said clutch to minimize the load of said engine when said accelerating state detecting means detects an accelerating state of said vehicle.

3. A heating apparatus according to claim 1, wherein:

said accelerating state detecting means includes a throttle opening sensor for detecting an opening degree of a throttle valve of said engine; and said heating control means controls said clutch to stop the transmission of the rotational driving force from said engine to said rotor when the vehicle speed detected by said vehicle speed sensor is less than the predetermined speed and further the throttle opening degree detected by said throttle opening degree sensor is more than a set value.

4. A heating apparatus according to claim 1, wherein:

said accelerating state detecting means includes a rotational speed sensor for detecting a rotational speed of said engine; and said heating control means controls said clutch to stop the transmission of the rotational driving force from said engine to said rotor when the vehicle speed detected by said vehicle speed sensor is more than the predetermined speed and further the engine rotational speed detected by said rotational speed sensor is more than a set value.

5. A heating apparatus according to claim 1, further comprising:

an engine load sensor for detecting a load of said engine;

wherein said heating controls means control said clutch to reduce a load of said engine when the engine load detected by said engine load sensor is more than a set value.

6. A heating apparatus according to claim 5, wherein said engine load sensor includes an intake pressure sensor for detecting a pressure in an intake pipe of said engine.

7. A heating apparatus according to claim 4, wherein said clutch includes an electromagnetic coil which is electrically controlled by said heating control means.

8. A heating apparatus according to claim 4, further comprising:

a heating preference switch for giving a priority on a heating operation; wherein, when said heating preference switch is set off, said heating control means controls said clutch to stop the transmission of the rotational driving force from said engine to said rotor.

9. A heating apparatus according to claim 1, wherein said thermal medium is cooling water for cooling said engine.

10. A heating apparatus according to claim 9, further comprising:

a cooling water temperature sensor for detecting a temperature of the cooling water; wherein, when said cooling water temperature detected by said cooling water temperature sensor is more than a set value, said heating control means controls said clutch to stop the transmission of the rotational driving force from said engine to said rotor.

11. A heating apparatus according to claim 3, wherein said heating control means controls said clutch to transmit the rotational driving force from said engine to said rotor when the vehicle speed detected by said vehicle speed sensor is more than the predetermined speed, even when the throttle opening degree detected by said throttle opening degree sensor is more than the set value.

12. A heating apparatus according to claim 4, wherein said heating control means controls said clutch to transmit the rotational driving force from said engine to said rotor when the vehicle speed detected by said vehicle speed sensor is more than the predetermined speed and further the engine rotational speed detected by said rotational speed sensor is less than the set value.

13. A heating apparatus according to claim 8, wherein, when said heating preference switch is set on, said heating control means controls aid clutch to transmit the rotational driving force from said engine to said rotor.

14. A heating apparatus for a vehicle having an engine for running said vehicle, said heating apparatus comprising:

a heating heat exchanger for heating air by heat-exchanging between a thermal medium and the air;

a heat-generating unit using a shearing force, said heat-generating unit having a rotor which rotates when a rotational driving force of said engine is applied thereto, a heat-generating chamber for sealing therein viscous fluid which generates heat when a shearing force generated by a rotational driving force of said rotor is applied thereto, said heat-generating unit being for heating the thermal medium circulating between said engine and said heating heat exchanger by generated heat of the viscous fluid in said heat-generating chamber;

a driving force transmitting unit for transmitting a rotational driving force of said engine to said rotor;

shearing state switching means for switching a shearing state of the viscous fluid by the rotational driving force of said rotor;

accelerating state detecting means for detecting an accelerating state of said vehicle; and heating control means including a vehicle speed sensor for detecting a vehicle speed of said vehicle, wherein said heating control means controls said shearing state switching means to stop a shearing operation of the viscous fluid when said accelerating state detecting means detects an accelerating state of said vehicle and the vehicle speed is less than a predetermined speed, and said heating control means controls said shearing state switching means to perform the shearing operation of the viscous fluid when the vehicle speed is less than the predetermined speed and the accelerating state is not detected or when the vehicle speed is more than the predetermined speed.

15. A heating apparatus for a vehicle having an engine for running said vehicle, said heating apparatus comprising:

a heat exchanger for heating air by heat-exchanging between a thermal medium and the air;

a heat-generating unit having a rotor which rotates when a rotational driving force of said engine is applied thereto, said heat-generating unit heating the thermal medium circulating between said engine and said heat exchanger;

a driving force transmitting unit for transmitting a rotational driving force of said engine to said rotor;

accelerating state detecting means for detecting an accelerating state of said vehicle;

a vehicle speed sensor for detecting a vehicle speed of said vehicle; and control means for controlling said driving force transmitting unit to stop the transmission of the rotational driving force from said engine to said rotor when the vehicle speed is less than a predetermined speed and said accelerating state detecting means detects an accelerating state of said vehicle, said control means controlling said driving force transmitting unit to transmit the rotational driving force from said engine to said rotor when the vehicle speed is less than the predetermined speed and the accelerating state is not detected, said control means controlling said driving force transmitting unit to transmit the rotational driving force from said engine to said rotor when the vehicle speed is above the predetermined speed.

* * * * *